United States Patent
De Groot et al.

[11] Patent Number: 5,992,093
[45] Date of Patent: Nov. 30, 1999

[54] GROWTH SUBSTRATE COMPRISING SHORT TRANSVERSALLY EXTENDING MINERAL WOOL FIBRES

[75] Inventors: Jacob Frank De Groot, Roermond, Netherlands; Lars Hansen, Frederiksberg, Denmark

[73] Assignee: Rockwool/Grodan B.V., Melick-Herkenbosch, Netherlands

[21] Appl. No.: 08/776,093
[22] PCT Filed: Jul. 6, 1995
[86] PCT No.: PCT/EP95/02697
    § 371 Date: Apr. 3, 1997
    § 102(e) Date: Apr. 3, 1997
[87] PCT Pub. No.: WO96/02127
    PCT Pub. Date: Feb. 1, 1996

[30] Foreign Application Priority Data

Jul. 13, 1994 [EP] European Pat. Off. ............ 94202032

[51] Int. Cl.⁶ .................................................. A01G 31/00
[52] U.S. Cl. .................................................. 47/64; 47/59
[58] Field of Search ............................................ 47/59, 64

[56] References Cited

U.S. PATENT DOCUMENTS

| | | | |
|---|---|---|---|
| 4,949,503 | 8/1990 | Blok | 47/64 |
| 5,009,031 | 4/1991 | Knop et al. | 47/64 |
| 5,133,151 | 7/1992 | Blok | 47/64 |
| 5,224,292 | 7/1993 | Anton | 47/64 |
| 5,724,766 | 3/1998 | Behrens | 47/64 X |

FOREIGN PATENT DOCUMENTS

| | | |
|---|---|---|
| 0277397 | 8/1988 | European Pat. Off. . |
| 277397 | 10/1988 | European Pat. Off. . |
| 8901736 | 3/1989 | WIPO . |
| WO89/01736 | 3/1989 | WIPO . |

*Primary Examiner*—Peter A. Nelson
*Attorney, Agent, or Firm*—Webb Ziesenheim Logsdon Orkin & Hanson, P.C.

[57] ABSTRACT

The invention relates to a growth substrate comprising at least one layer of short transversally extending mineral wool fibers and at least one surface layer of mineral wool fibers, wherein preferably the layer of short transversally extending mineral wool fibers is interposed between two surface layers of mineral wool fibers, or wherein preferably the layer of short transversally extending mineral wool fibers is interposed between two surface layers of horizontally extending mineral wool fibers.

10 Claims, 2 Drawing Sheets

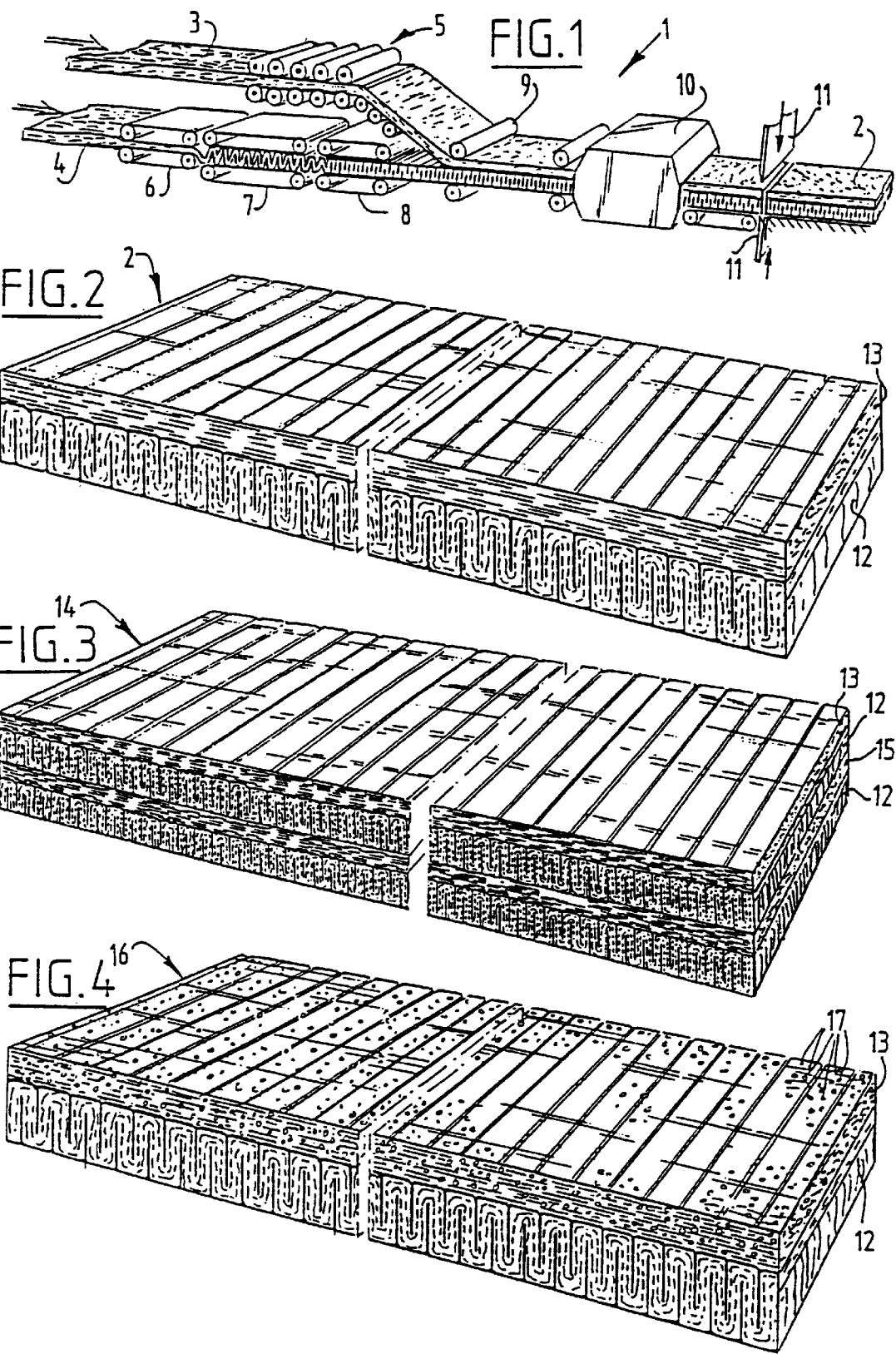

GROWTH SUBSTRATE COMPRISING SHORT TRANSVERSALLY EXTENDING MINERAL WOOL FIBRES

BACKGROUND OF THE INVENTION

1) Field of the Invention

The present invention relates to growth substrates which predominantly consists of mineral wool fibres formed into a coherent matrix and mutually bonded by a cured binding agent and if appropriate impregnated with a wetting agent for rapid water uptake before use. These mineral wool fibres may be stone wool fibres, glass fibres, slag fibres and the like.

2) Description of the Prior Art

The air and water distribution within the growth substrate is dependent on the hydraulic pressure over the height of the growth substrate, but also dependent on the internal surface.

The internal surface is a function of the density of the growth substrate, of the fibre diameter of the mineral wool fibres used and of the content of non-fibre material (shot).

Growth substrates have a total density within the range of 5–200 kg/m$^3$, preferably between 20–180 kg/m$^3$, more preferably 40–120 kg/m$^3$, and practically 50–70 kg/m$^3$.

The fibre diameter is normally within the range of 1–20 micrometer, preferably 2–10 micrometer, such as 3–8 micrometer.

The amount of shot varies between 0–50 Wt % such as 0–40 Wt %. For stone wool it is normally 30–35 Wt % and for glass wool it is 5–10 Wt %.

Furthermore the aspect ratio (length over diameter ratio) is normally less than 5 for shot.

The value for the internal surface varies between 5,000 and 20,000 m$^2$/m$^3$. A high internal surface is in the range of 16,000–20,000, low in the range of 5,000–8,000 and moderate in the range of 9,000–15,000 m$^2$/m$^3$.

The invention has for its object to provide new growth substrates which possess better properties, such as a better water distribution, a better air distribution, a better root penetration and distribution, and further a better compression or bending strength.

SUMMARY OF THE INVENTION

These new growth substrates have become available because of the use of a new technology for the production of growth substrates, that is the provision of substrates comprising at least one layer of short transversally extending fibres. Such a layer is produced by superfolding in an up/downward direction a web of mineral wool fibres within which the fibres are predominantly horizontally orientated. Accordingly there is produced in a longitudinal direction a zigzag-wise formed layer which is indicated within this application as a layer of short transversally extending mineral wool fibres. For schematic illustrations reference is made to the annexed drawings. Each fold has a width in the range of 2–50 mm, preferably 4–40 mm, such as 2–40 mm.

In general the present invention provides a growth substrate, comprising at least one layer of short transversally extending mineral wool fibres and at least one surface layer of mineral wool fibres. By using such a layer of short transversally extending fibres, within that layer there is a better compression strength, a better root penetration and also a better water drainage. All these improved properties will be sold in an improved growth that provides better initial growth, better yield and the like. Due to the presence of a surface layer which maybe on top or on the bottom side, a better water spreading from the dripping point, a better drainage or a better growth substrate walkability or fixation to the underground may be obtained. Accordingly it is preferred that the growth substrate have the layer of short transversally extending mineral wool fibres interposed between two surface layers of mineral wool fibres.

According to a preferred embodiment the surface layer comprises horizontally extending mineral wool fibres. Accordingly a growth substrate is provided comprising a better water spreadability from the dripping point, a better compression strength, a better root penetration and a better drainage.

According to another preferred embodiment the layer of short transversally extending mineral wool fibres is interposed between two surface layers of horizontally extending mineral wool fibres. Such a growth substrate maybe used for roof gardens because the outer surface layer may have a sufficient walking strength, whereas the bottom surface layer may provide optimal properties for fixation to the underground mechanically or physically. Still the inner layer of short transverse extending mineral wool fibre will provide an optimum growth substrate environment. Plants may grow in this growth substrate when at the desired plant location of the substrate the upper surface layer is partially removed.

In this respect it is noted that the same growth substrate material may be used in a filter device because the layer of short transversally extending mineral wool fibres provide excellent hydraulic conductivity properties within two scales of outer surface layers.

According to another preferred embodiment, two layers of short transversally extending mineral wool fibres are contacted by a contact layer of horizontally extending mineral wool fibres. In such a configuration of a growth substrate there is an optimum spreading of water at the top layer, then a layer for optimal root growth and water drainage, followed by another layer for additional water spreading thereby avoiding local sub-optimal areas for electrical conductivity and pH. Finally the lower layer provides optimal drainage. Still the total average density may be lower than the previously discussed substrates.

According to another preferred embodiment the growth substrate includes the surface layer having a curing oven profile. In this case there is another embodiment of the surface layers. The surface layer have the form of curing oven profiles, which provide optimal compression strength although at a relatively low internal surface. The layer of short transversally extending fibres present between the curing oven profiles provides optimal root plant rooting conditions.

According to another preferred embodiment the growth substrate, includes the surface layer having a layer of short transversally extending mineral wool fibres. In this case the growth substrate has extremely good drainage properties, and when the total density is rather low there is better root penetration in the top layer.

In order to have optimal buffering capacity of water and nutrients it is prefered that these particles consist of inorganic particles, such as clay and/or partly inorganic particles such as lignite.

In order to have optimal conditions for storage and use it is preferred that these particles consist of inorganic particles, such as clay and lignite particles.

According to another preferred embodiment, growth substrates include the surface layer or contact layer having internal surface increasing particles, preferably inorganic particles such as clay particles. Due to the outer sub-layer being of high density there is no plant growth or vegetation possible through that outer sub layer thereby providing a growth substrate with weed control properties. At a side of desired plant growth the outer sub layer is to be removed thereby providing optimal growth in the underlying layers.

Although the layer of short transversally extending fibres, the surface layer and the contact layer may have the same internal surface, it is preferred that the surface and contact layer have a higher internal surface than the layer of short transversally extending fibres. Thereby optimal conditions are provided for water spreading, water drainage and plant root growth and distribution.

Finally it is preferred that the growth substrate according to the invention has an internal surface that increases from the bottom to the top of the growth substrate. Thereby a very even water distribution through the height of the growth substrate is obtained.

Other features and properties of the growth substrate according to the invention will be apparent from the following description of preferred embodiments of the growth substrates which description should not be considered as limiting the scope of the invention. In the description reference is made to the following drawings.

BRIEF DESCRIPTION OF THE DRAWINGS

FIG. 1 shows schematically a production installation for a growth substrate;

FIGS. 2–6 and 8 growth substrates according to the invention;

DETAILED DESCRIPTION OF THE PREFERRED EMBODIMENTS

Figure 5:
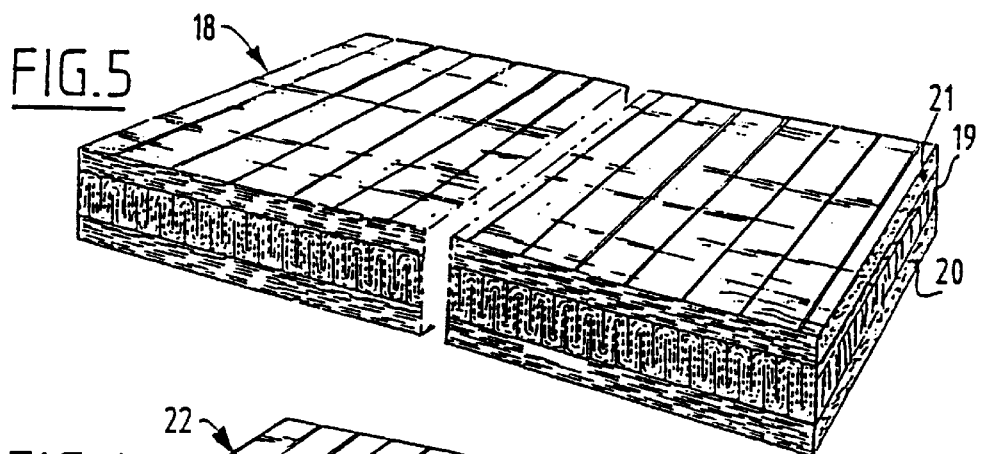

FIG. 1 shows an installation for the production of the growth substrate 2 disclosed in FIG. 2. The installation comprises two feed lines of layers 3,4 of substantially horizontally (longitudinal) extending mineral wool fibres. Layer 3 is compressed in a roller compression unit 5 to a density of about 100 kg/m³. Layer 4 is compressed between conveyor 6 to a density of about 40 kg/m³ and then heightwise folded in a folding unit 7 and finally modelled in a modelling unit 8. The two layers 3 and 4 are then combined at the pair of rollers 9 and the assembled layers 3 and 4 are passed through a curing oven 10 within which the binding agent is cured. Finally using cutting blades 11 the row of growth substrate is cut into growth substrates 2.

FIG. 2 shows the growth substrate 2 in greater detail. It comprises a bottom layer 12 of short transversally extending mineral wool fibres and on top a top layer 13 of substantially horizontally extending mineral wool fibres. Layer 13 has a higher density than layer 12 but instead of the higher density fibres, fibres may be used in layer 13 which were thinner than the fibres used in layer 12. In such cases layer 13 has a higher internal surface than layer 12. This product has a good water spreadability in layer 13 and in layer 12 an optimal compression strength, a good root penetration and a better water drainage.

FIG. 3 shows a growth substrate 14 essentially consisting of two superimposed growth substrates 12. In this case the two layers 12 are contacted by a contact layer 15, which is of similar nature as layer 13. The layers 13 and 15 may have the same internal surface and the layers 12 may also have the same internal surfaces. Layer 13 provides optimal water spreadability. The underlying layer 12 provides optimal root growth and water drainage. The contact layer 15 provides additional water spreading thereby avoiding sub-optimal areas for electrical conductivity and pH. The lowest layer 12 provides optimal drainage. Although more complex in nature, the growth substrate 14 may have a lower total average density than the growth substrate 2.

FIG. 4 shows a growth substrate 16 according to the invention which comprises a similar construction as growth substrate 2. However, in this case the internal surface of layer 13 is further increased by the inclusion of internal surface increasing particles 17, such as clay particles or lignite. It may be possible that these particles are not homogeneously distributed over the total height of the layer 13 but may be present in the upper part of layer 13 and in the alternative in the lower part of layer 13. Accordingly the internal surface is increased further thereby improving water spreadability, reducing the total overall density and providing a cheaper product. There will be an extra effect in the form of an improved yield, improved growth rate and when included in layer 13 a slower release of incorporated fertilizer.

FIG. 5 shows a growth substrate 18 according to the invention in which a layer 19 of transversally extending mineral wool fibres is interposed between two surface layers 20 and 21. The layers 20 and 21 have a higher internal surface than layer 19. This is an optimal growth substrate for roof gardens because layer 21 may have a higher density than layer 20 such that it provides walking properties. Layer 20 may provide water retaining (buffer) properties and furthermore properties for fixation to the roof by mechanical or physical means.

Figure 6:
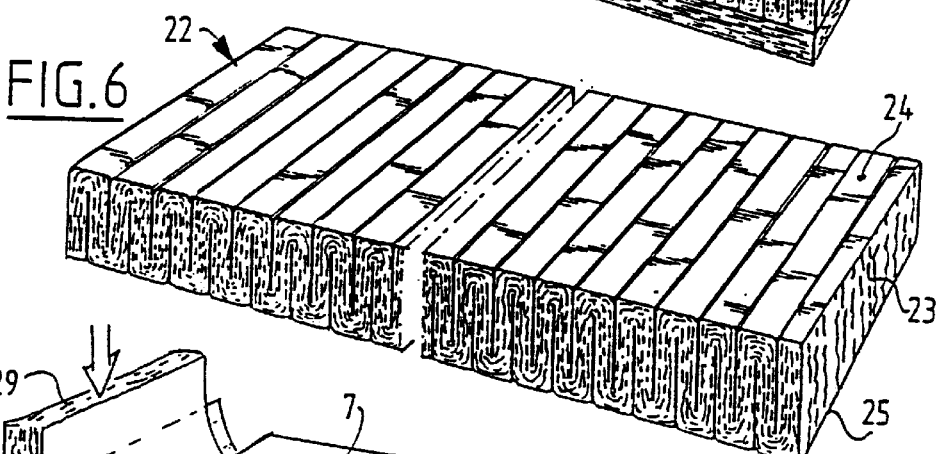

FIG. 6 shows a growth substrate 22 according to the invention comprising a layer of short transversally extending mineral wool fibres 23 and further as surface layers in the form of curing oven profiles 24 and 25. The curing oven profiles possess skale properties, and provide an improved compression strength although at relatively low internal surfaces, whereas layer 23 provides optimal plant rooting properties.

Figure 7:
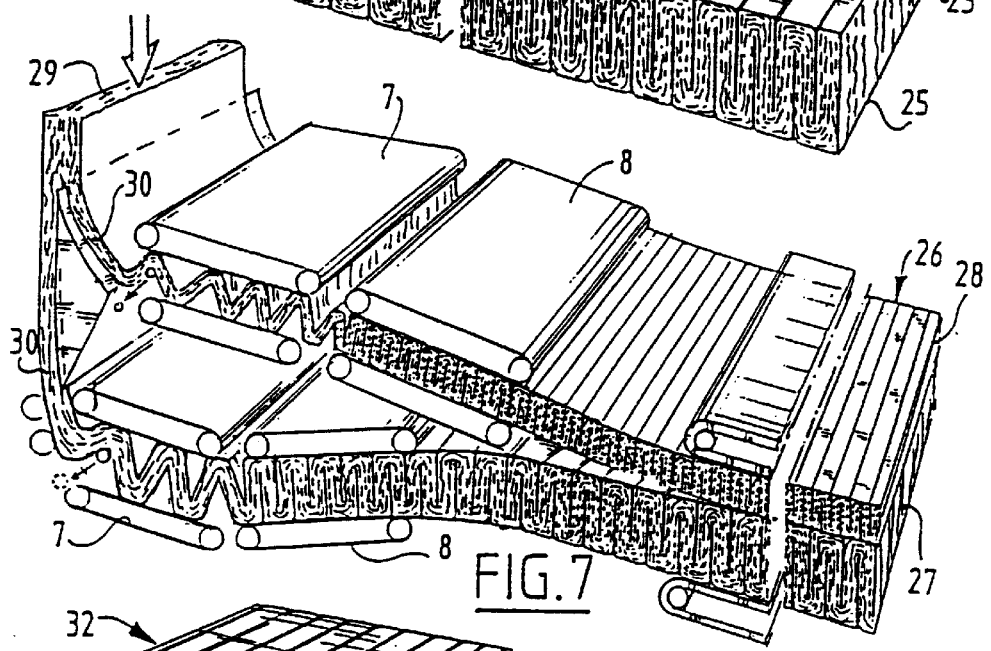
FIG. 7 schematically shows the production of another growth substrate according to the invention.

FIG. 7 relates to the production of a growth substrate 26 comprising two layers of short transversally extending mineral wool fibres 27 and 28. This substrate 26 is produced in that a feed web 29 is split and both sublayers are subjected to superfolding in folding units 7 and modelling units 8. Than the two layers are superimposed and passed through a curing oven (not illustrated).

The layer 28 has a higher density than layer 27 due to a difference in compression. The growth substrate 26 has extremely good plant rooting and drainage properties.

Figure 8:
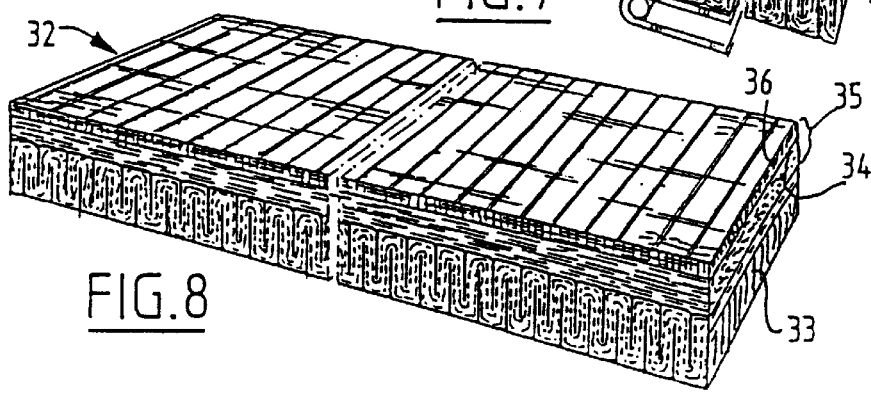

Finally FIG. 8 shows a plant substrate 32 according to the invention having a construction similar to growth substrate 2. Growth substrate 32 comprises a layer 33 of short transversally extending mineral wool fibres and a surface layer 34 consisting of an outer sublayer 35 and a inner sublayer 36. Layer 35 has a higher internal surface than layer 36. This difference in density may be obtained by impacting layer 34 by for instance hammering so that the layer 34 is subdivided in a high internal layer 35 and a lower internal surface layer 36. The extremely dense layer is unsuitable for plant growth. However, when plant growth is desired at a specific site then at that specific site part of layer 35 is removed.

We claim:

1. Growth substrate, comprising at least one layer of short transversally extending mineral wool fibres and at least one surface layer of horizontally extending mineral wool fibres, wherein the mineral wool fibres of the surface layer extend substantially perpendicular to the layer of short transversally extending mineral wool fibres.

2. Growth substrate, as claimed in claim 1, wherein the layer of short transversally extending mineral wool fibres is interposed between two surface layers of mineral wool fibres.

3. Growth substrate as claimed in claim 1, wherein the surface layer and the contact layer have a higher internal surface than the layer of short transversally extending mineral wool fibres.

4. Growth substrate as claimed in claim 1, wherein the layer of short transversally extending mineral wool fibres is interposed between two surface layers of horizontally extending mineral wool fibres.

5. Growth substrate as claimed in claim 1, comprising two layers of short transversally extending mineral wool fibres contacted by a contact layer of horizontally extending mineral wool fibres.

6. Growth substrate as claimed in claim 1, wherein the surface layer comprises a curing oven profile.

7. Growth substrate as claimed in claim 1, wherein the surface layer comprises a layer of short transversally extending mineral wool fibres.

8. Growth substrate as claimed in claim 1, wherein the surface layer or contact layer comprises internal surface increasing particles, preferably inorganic particles such as clay particles.

9. Growth substrate as claimed in claim 1, wherein the surface layer comprises a outer sublayer of higher density than the inner sublayer.

10. Growth substrate as claimed in claim 1, wherein the internal surface increases from the bottom towards the top of the growth substrate.

\* \* \* \* \*